United States Patent
Fukano et al.

(10) Patent No.: US 8,141,582 B2
(45) Date of Patent: Mar. 27, 2012

(54) FLOW AMOUNT ADJUSTING VALVE

(75) Inventors: Yoshihiro Fukano, Moriya (JP);
Tadashi Uchino, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 1127 days.

(21) Appl. No.: 11/963,896

(22) Filed: Dec. 24, 2007

(65) Prior Publication Data

US 2008/0149874 A1 Jun. 26, 2008

(30) Foreign Application Priority Data

Dec. 25, 2006 (JP) .................................. 2006-347566

(51) Int. Cl.
*F16K 37/00* (2006.01)
*F16K 5/10* (2006.01)
*F16K 31/50* (2006.01)
*G01D 5/02* (2006.01)

(52) U.S. Cl. ..... 137/556; 251/209; 251/267; 251/335.2; 116/277; 116/282

(58) Field of Classification Search ....... 137/556–556.6; 251/205–209, 266–269, 335.2; 166/277, 166/282

See application file for complete search history.

(56) References Cited

U.S. PATENT DOCUMENTS

| | | | | |
|---|---|---|---|---|
| 2,091,618 | A | * | 8/1937 | Szabo ............................ 251/175 |
| 2,167,321 | A | * | 7/1939 | Abercrombie ................ 137/556 |
| 2,977,981 | A | * | 4/1961 | Jarrett ............................ 137/553 |
| 4,446,887 | A | * | 5/1984 | Redmon et al. ............... 137/556 |
| 4,577,831 | A | * | 3/1986 | DiBartolo ........................ 251/93 |
| 5,004,011 | A | * | 4/1991 | Linder et al. .................. 137/556 |
| 6,089,264 | A | | 7/2000 | Spiess |

FOREIGN PATENT DOCUMENTS

| | | |
|---|---|---|
| CN | 2898518 | 5/2007 |
| DE | 1600813 | 9/1971 |
| DE | 8229484 | 3/1984 |
| DE | 3503598 | 1/1986 |
| DE | 3515752 | 11/1986 |
| DE | 9421279 | 8/1995 |
| DE | 102005017618 | 10/2006 |
| EP | 0884514 | 12/1998 |
| JP | 52-056321 | 4/1977 |
| JP | 52-056323 | 4/1977 |
| JP | 52-072125 | 5/1977 |
| JP | 57-025581 | 2/1982 |
| JP | 01-299385 | 12/1989 |
| JP | 05-079570 | 3/1993 |
| JP | 08-159332 | 6/1996 |
| JP | 11-230407 | 8/1999 |
| JP | 2006-336701 | 12/2006 |

* cited by examiner

*Primary Examiner* — John Rivell
*Assistant Examiner* — Atif Chaudry
(74) *Attorney, Agent, or Firm* — Paul A. Guss (57) ABSTRACT

A flow amount adjusting valve includes a handle that enables an opening/closing amount of a valve plug to be adjusted. A piston connected to the valve plug is screw-engaged with a first axial portion of the handle. Additionally, along with displacement of the valve plug in the axial direction via the piston under a rotating action of the handle, an indicator element is accommodated in an interior portion of the handle. A first indicator undergoes screw-engagement with respect to the handle, and the indicator element is displaced together with displacement of the valve plug, such that displacement of the valve plug can be confirmed visually from outside the flow amount adjusting valve.

9 Claims, 8 Drawing Sheets

FLOW AMOUNT ADJUSTING VALVE

BACKGROUND OF THE INVENTION

1. Field of the Invention

The present invention relates to a flow amount adjusting valve, which enables adjustment of a flow amount of a pressure fluid under an opening/closing operation of a valve.

2. Description of the Related Art

Heretofore, a flow amount adjusting valve has been known, in which a conical valve plug is moveably disposed inside of a body equipped with a passage therein through which fluid flows, and wherein a flow amount of the fluid that flows through a gap between the valve plug and a valve seat is adjustable by causing the valve plug to approach and separate away from a valve seat which faces the flow passage.

In such a flow amount adjusting valve, for example as disclosed in Japanese Laid-Open Patent Publication No. 11-230407, an operating element is provided for displacing the valve plug. The valve plug is displaced in an axial direction by an operator turning the operating element, whereby the flow amount of a desired fluid is adjusted by causing the valve plug to approach and separate away from the valve seat.

However, in the aforementioned conventional technique, when a needle valve that forms the valve plug is displaced along the axial direction, because a function is not provided that allows the displacement amount (movement amount) of the valve plug to be confirmed visually from the outside, it is difficult and troublesome for the flow amount of the fluid, which is adjusted by displacement of the needle valve, to be adjusted with high accuracy. Further, in the event that a plurality of such flow amount adjusting valves are used simultaneously, it is necessary to adjust flow amounts while performing measurements on each of the flow amount adjusting valves respectively, such that the adjustment operation becomes extremely cumbersome.

SUMMARY OF THE INVENTION

A general object of the present invention is to provide a flow amount adjusting valve, which enables an opening/closing amount of a valve plug to be easily and reliably grasped, thus allowing the flow amount of a pressure fluid to be stably adjusted with a high degree of accuracy.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
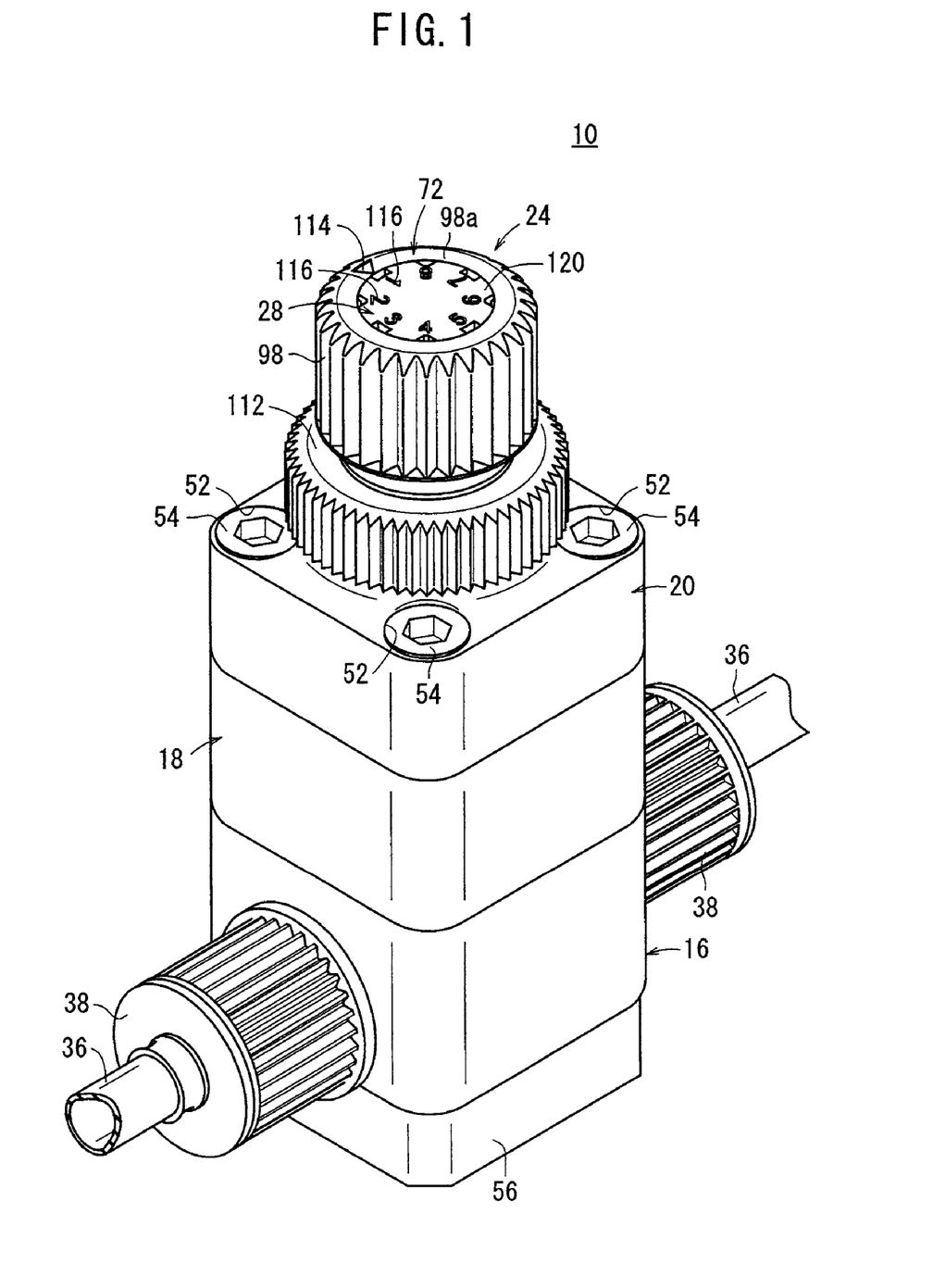
FIG. 1 is an exterior perspective view of a flow amount adjusting valve according to an embodiment of the present invention.

In FIG. 1, reference numeral 10 indicates a flow amount adjusting valve in accordance with an embodiment of the present invention.

Figure 2:
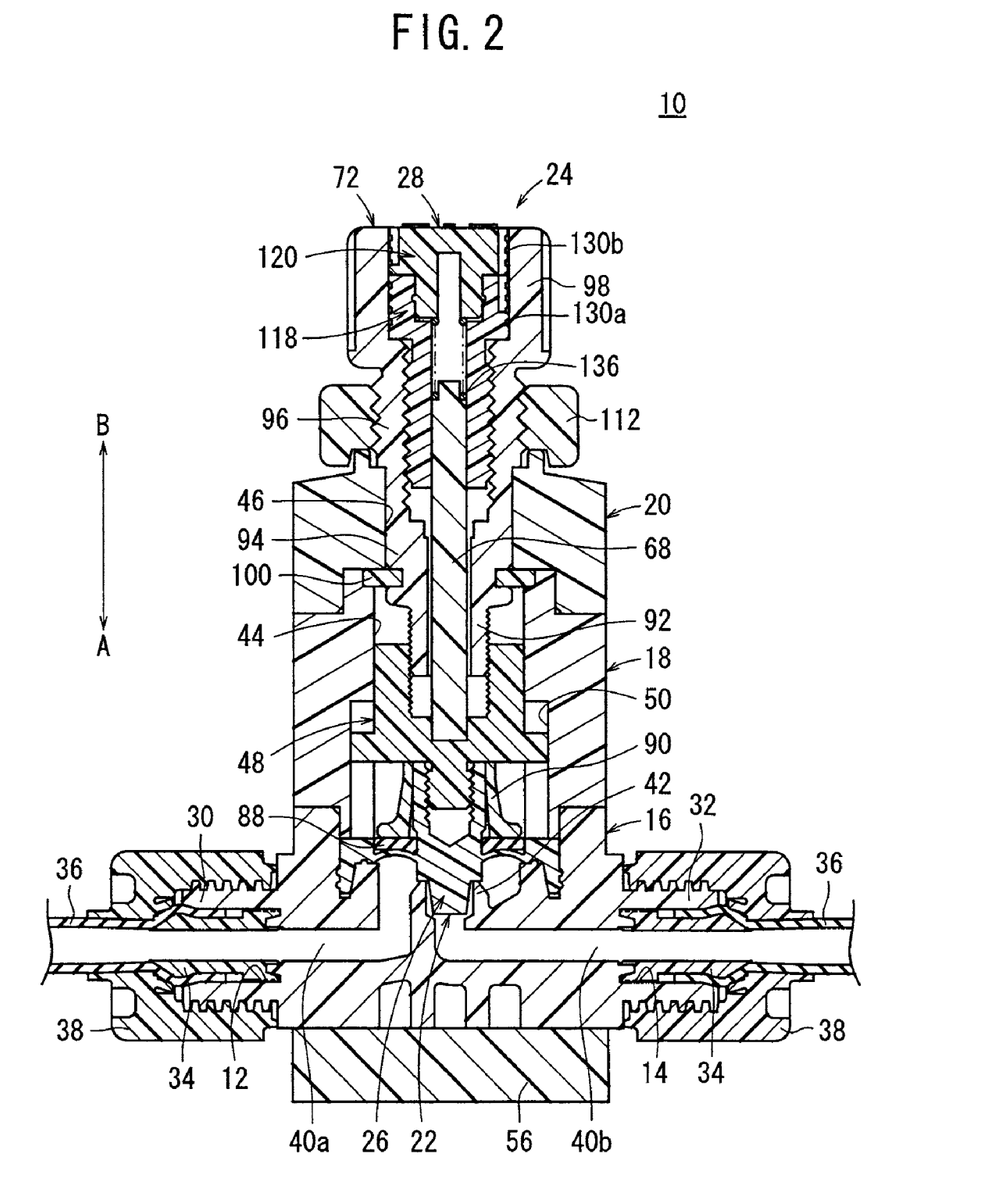
FIG. 2. is a vertical cross sectional view of the flow amount adjusting valve shown in FIG. 1.
Figure 3:
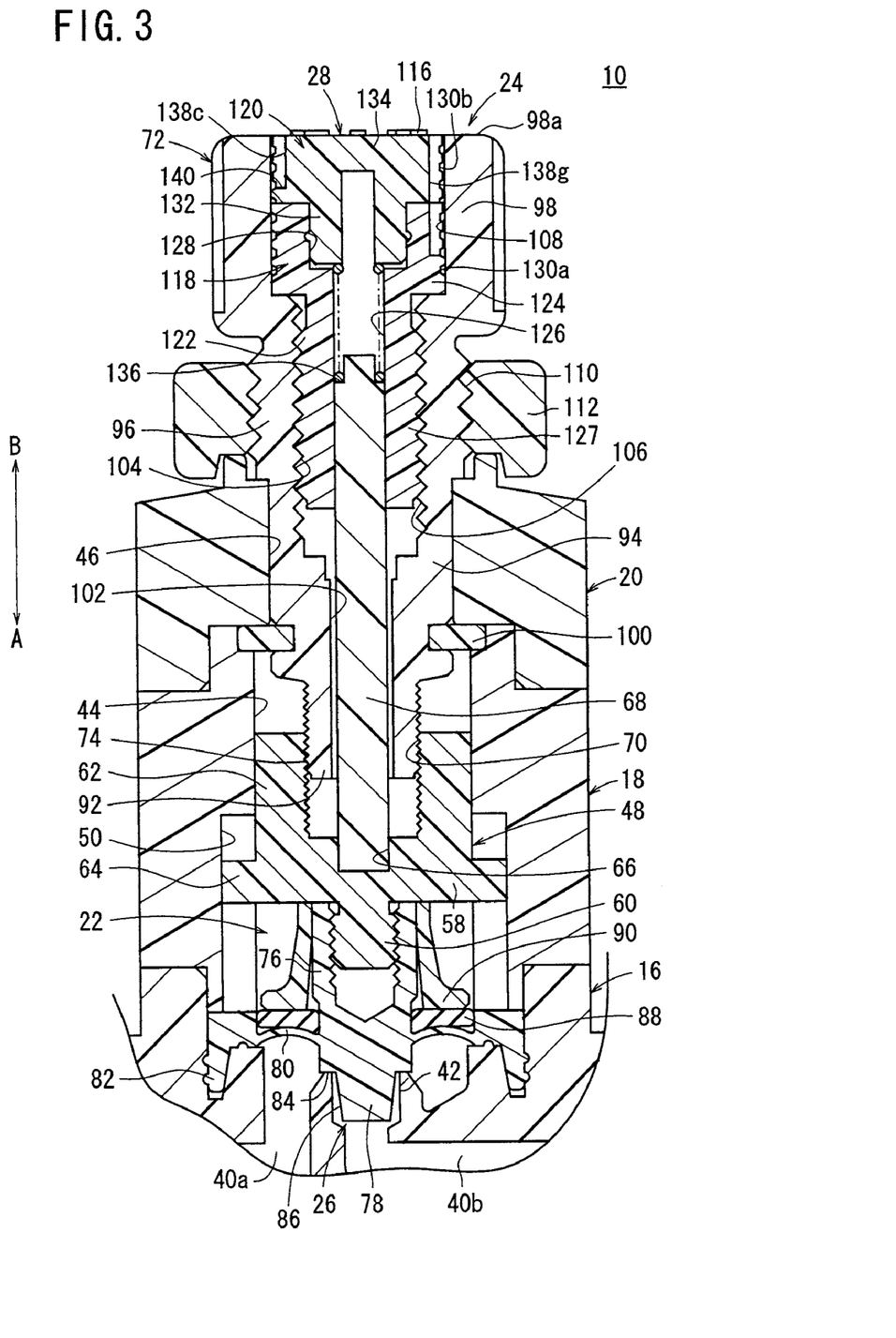
FIG. 3. is an enlarged vertical cross sectional view of a vicinity of the valve mechanism and an operating element in the flow amount adjusting valve of FIG. 2.

As shown in FIGS. 1 to 3, the flow amount adjusting valve 10 includes a valve body (body) 16 having first and second ports 12, 14 through which a pressure fluid is supplied and discharged, first and second housings (body) 18, 20 that are connected to an upper portion of the valve body 16, a valve mechanism 22 displaceably disposed inside the valve body 16 and the first housing 18 for adjusting a flow amount of the pressure fluid that flows through the first port 12 and the second port 14, an operating element 24 supported rotatably inside the first and second housings 18, 20 which enables the flow amount of the pressure fluid to be adjusted, and an indicator element 28 for permitting visual recognition of the displacement amount of the valve plug 26 that constitutes part of the valve mechanism 22.

A first connecting member 30 is formed from a resin material, and projects outwardly from one side surface of the valve body 16. The first port 12 through which the pressure fluid is supplied opens into the interior of the first connecting member 30. On the other hand, a second connecting member 32 is formed and projects outwardly on the other side surface of the valve body 16. A second port 14 through which the pressure fluid is discharged opens into the interior of the second connecting member 32.

Couplers 34 are inserted into the first and second ports 12, 14, and tubes 36, through which the pressure fluid flows, are inserted respectively between inner circumferential surfaces of the first and second ports 12, 14 and the couplers 34. Additionally, the tubes 36 are fixed with respect to the first and second connecting members 30, 32 by threaded engagement of connecting caps 38 onto threaded portions, which are formed on outer circumferential surfaces of the first and second connecting members 30, 32 (see FIG. 2).

Further, communication passages 40a, 40b are formed respectively in the valve body 16, extending in a substantially horizontal direction from the first and second ports 12, 14. A valve seat 42, on which the valve plug 26 of the valve mechanism 22 is seatable, is formed at a region that interconnects the communication passages 40a, 40b. The valve seat 42 is formed such that it projects upwardly, so as to face toward the first housing 18 that is connected to the valve body 16.

The first and second housings 18, 20 include first and second holes 44, 46 therein, which penetrate along the axial direction substantially in a center portion thereof. The first and second holes 44, 46 communicate with the communication passages 40a, 40b through the valve seat 42 of the valve body 16.

A piston 48 constituting part of the valve mechanism 22 is inserted displaceably along the axial direction (the direction of arrows A and B) in the first hole 44. A pair of guide grooves 50, which are recessed a predetermined depth, are formed in the inner circumferential surface of the first hole 44, extending toward the side of the valve body 16 (in the direction of the arrow A). On the other hand, a portion of the operating element 24 is inserted and supported rotatably in the second hole 46.

Further, connecting bolts 54 are inserted into the first and second housings 18, 20 through bolt holes 52, which are disposed in the four corners of the first and second housings 18, 20. The connecting bolts 54, which are inserted from the second housing 20 and toward the side of the first housing 18 (in the direction of the arrow A), are screw-engaged with a base plate 56 disposed on a lower part of the valve body 16. Accordingly, the valve body 16 and the first and second housings 18, 20 are connected together integrally by the connecting bolts 54.

The valve mechanism 22 includes a piston 48, which is disposed displaceably inside of the first hole 44, and a valve plug 26 connected to the piston 48 and which is seatable on the valve seat 42.

The piston 48 is constructed from a circular plate shaped base 58, which extends in a direction substantially perpendicular to the axis of the piston 48, a projection 60 that projects toward the side of the valve body 16 (in the direction of the arrow A) from an end surface of the base 58, and a tubular member 62 that projects in a cylindrical shape from the other end surface of the base 58. Screw threads are engraved on the projection 60 along the outer circumferential surface thereof, whereby the valve plug 26 is screw-engaged with respect to the projection 60. Owing thereto, the piston 48 and the valve plug 26 are connected together for displacement integrally along the axial direction.

Further, a pair of guide members 64 that project in a radially outward direction are formed on the outer circumferential surface of the base 58. The guide members 64 are inserted into the guide grooves 50 formed in the first hole 44. As a result, the piston 48 is displaceable only in the axial direction (the direction of arrows A and B) along the guide grooves 50, and displacement of the piston 48 in a rotational direction about the axis thereof is restricted. Stated otherwise, the guide members 64 function as rotation stoppers, for restricting rotational displacement of the piston 48.

On the other hand, a hole 66 is formed in the center of the tubular member 62 in the other end surface of the base 58. A shaft 68, which is substantially rectangular shaped in cross section, is fitted into the hole 66. The shaft 68 has an elongate form extending in the axial direction (the direction of arrows A and B), wherein by being fitted into the hole 66, the shaft 68 is disposed so as to be displaceable in the axial direction together with the piston 48.

Further, the outer circumferential surface of the tubular member 62 slides in contact with the inner circumferential surface of the first hole 44, while being guided along the axial direction (the direction of arrows A and B) when the piston 48 is displaced. On the other hand, first female threads 70 are formed along the axial direction on the inner circumferential surface of the tubular member 62, wherein the female threads 70 are screw-engaged with a first threaded portion (first screw-engagement portion) 74 of the handle 72 constituting the operating element 24, which is inserted into the tubular member 62. More specifically, by rotating the handle 72, the piston 48 is displaceable in the axial direction (in the direction of arrows A and B) by threaded engagement of the first female threads 70 with the first threaded portion 74.

Stated otherwise, rotational displacement of the operating element 24 is converted into linear displacement of the piston 48, through the first female threads 70 and the first threaded portion 74. In this case, the piston 48 is not displaced rotationally, since the guide members 64 engage within the guide grooves 50 of the first housing 18.

The valve plug 26 comprises a main body portion 76, which is formed from a resin material and connected to the piston 48, a valve member 78 formed on an end of the main body portion 76 and seatable on the valve seat 42, a skirt 80 extending radially outward from an outer circumferential surface of the valve member 78, and a peripheral edge portion 82 formed on the peripheral edge of the skirt 80, which is gripped and held between the valve body 16 and the first housing 18.

The main body portion 76 has a bottomed cylindrical shape, which is opened toward the side of the piston 48 (in the direction of the arrow B). The projection 60 of the piston 48 is inserted and screw-engaged in the interior of the main body portion 76. Accordingly, the valve plug 26 is connected with respect to the projection 60 of the piston 48.

The valve member 78 is equipped with a seat surface 84, which is disposed on an end of the main body portion 76 substantially perpendicular to the axis of the main body portion 76, and a tapered surface 86 that is gradually reduced in diameter in a direction (the direction of the arrow A) separating away from the seat surface 84. By abutment of the seat surface 84 against the end surface of the valve seat 42, the state of communication between the communication passages 40a, 40b is interrupted. Further, the skirt 80 is formed in the shape of a thin-film, and is flexibly disposed between the valve member 78 and the peripheral edge portion 82.

More specifically, when the valve plug 26 is displaced along the axial direction together with the piston 48, the skirt 80 undergoes flexural displacement along with displacement of the valve member 78, in a state such that the outer circumferential side thereof is held by the peripheral edge portion 82.

On the other hand, a protective member 88 is disposed on the skirt 80, on one side surface thereof on the side of the piston 48 (in the direction of the arrow B). The protective member 88 is formed in an annular shape from an elastic material such as rubber or the like, which is disposed in intimate contact with the skirt 80.

Further, a cylindrical ring body 90 having a flange portion is disposed on the outer circumferential side of the main body portion 76 that constitutes the valve plug 26, such that the inner circumferential surface thereof abuts against the outer circumferential surface of the main body portion 76, while the flange portion on the side of the skirt 80 (in the direction of the arrow A) of the valve plug 26 abuts against the protective member 88. Owing thereto, the projective member 88 is pressed toward the side of the skirt 80 by the ring body 90. That is, the skirt 80 is protected, owing to the protective member 88 being kept in intimate contact with the thin-film shaped skirt 80.

The operating element 24 is formed by a handle 72 that is supported rotatably with respect to a second hole 46 of the second housing 20. The handle 72 includes a first axial portion 92 formed on one end thereof, which is inserted through the first hole 44 of the first housing 18 and threadedly engages the piston 48, a second axial portion 94 adjacent to the first axial portion 92 and which is supported in the second hole 46 of the second housing 20, a third axial portion 96 adjacent to the second axial portion 94 and which is exposed on the outside of the second housing 20, and a gripping member 98 formed on the other end side for being gripped by an operator.

A first threaded portion 74 is engraved along the axial direction on an outer circumferential surface of the first axial portion 92. The first axial portion 92 is inserted into the tubular member 62 on the piston 48 and is screw-engaged with the first female threads 70. The outer peripheral diameter of the first axial portion 92 is set to be substantially the same as the inner peripheral diameter of the tubular member 62.

Further, the second axial portion 94 is expanded in diameter radially outward with respect to the first axial portion 92, and the outer circumferential surface thereof abuts and is supported rotatably in the second hole 46. An annular groove is disposed on the outer circumferential surface of the second axial portion 94, into which a stopper 100, which is sandwiched between the first housing 18 and the second housing 20, is inserted. As a result thereof, displacement of the second axial portion 94 in the axial direction (the direction of arrows A and B) with respect to the second housing 20 is regulated, and the second axial portion 94 is supported in a rotatably displaceable state about the central axis of the handle 72.

On the other hand, a through hole 102 penetrates along the axial direction through the interior of the first and second axial portions 92, 94. The shaft 68 that is fitted into the piston 48 is inserted through the through hole 102.

The third axial portion 96 is disposed between the second axial portion 94 and the gripping member 98, and is formed so as to be expanded in diameter only slightly with respect to the second axial portion 94. On the third axial portion 96, a stepped portion disposed at a boundary region with the second axial portion 94 engages with an end of the second housing 20, for thereby positioning the third axial portion 96 with respect to the second housing 20. Further, a screw hole 106, having second female threads (second screw-engagement portion) 104 formed along the inner circumferential surface thereof, is formed at the interior of the third axial portion 96. The diameter of the screw hole 106 is set to be larger than the diameter of the through hole 102. The screw hole 106 communicates with an accommodating hole 108 formed in the gripping member 98, and is screw-engaged with a part of the indicator element 28, which is accommodated within the accommodating hole 108.

Threads 110 are engraved along the axial direction on an outer circumferential surface of the third axial portion 96. A lock nut 112, which is arranged on an upper part of the second housing 20, is screw-engaged with the threads 110. The outer circumferential surface of the lock nut 112 is formed with ridges and valleys along the circumferential direction thereof. The lock nut 112 is displaced in the axial direction by rotating the lock nut 112 with respect to the third axial portion 96. In addition, rotational displacement of the handle 72 is regulated by abutment of the lock nut 112 against the end of the second housing 20. That is, the lock nut 112 performs a locking function for locking rotational operations of the handle 72.

The gripping member 98 is formed with a cylindrical shape, which is expanded in diameter radially outward with respect to the third axial portion 96. The outer circumferential surface of the gripping member 98 is formed with ridges and valleys along the circumferential direction for enabling easy grasping thereof by an operator. An accommodating hole 108, in which the indicator element 28 is accommodated, opens in the interior of the gripping member 98. The accommodating hole 108 is formed coaxially with the screw hole 106 and the through hole 102, and communicates mutually therewith.

Figure 4:
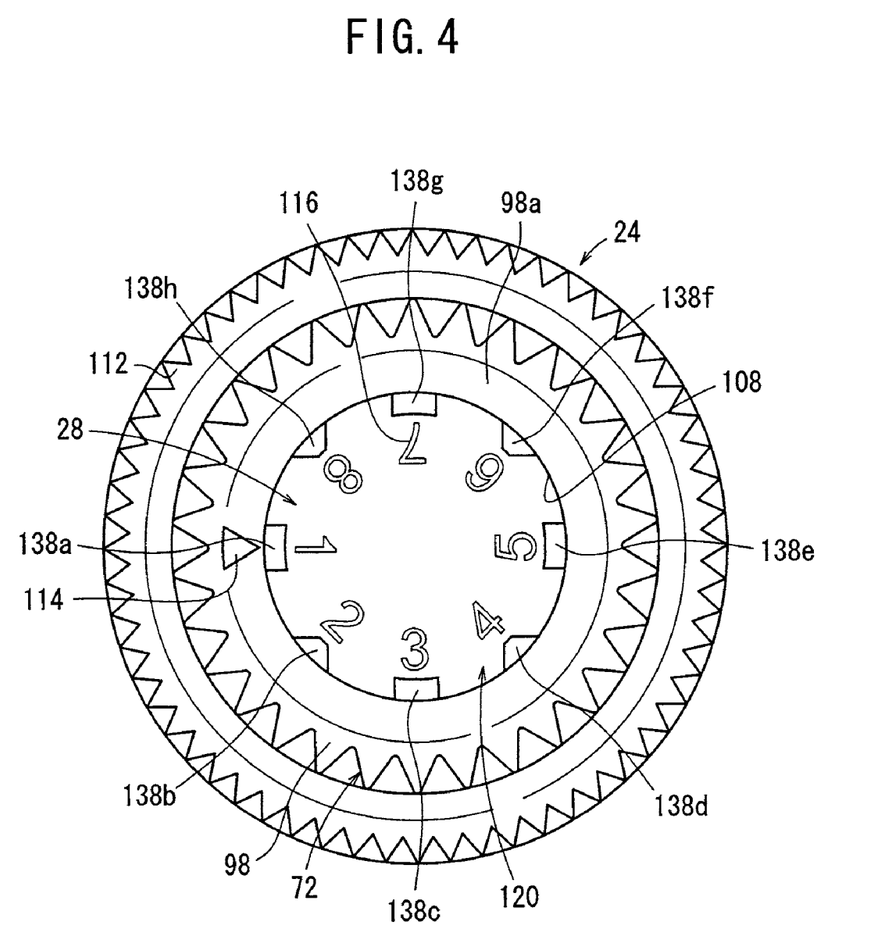
FIG. 4 is an enlarged plan view, as observed from above, of an operating element and an indicator element of the flow amount adjusting valve shown in FIG. 1.

Further, as shown in FIG. 4, a triangular pointer 114, with a shape that narrows toward a side of the accommodating hole 108, is formed on an end surface 98a of the gripping member 98. Display elements 116 of the indicator element 28 accommodated within the accommodating hole 108 are pointed to and indicated by the pointer 114.

More specifically, by gripping and rotating the gripping member 98, the handle 72 that makes up the operating element 24 is rotationally displaced via the second axial portion 94, which is supported by the second housing 20, whereby the piston 48 that is screw-engaged with the first axial portion 92 is displaced in the axial direction (the direction of arrows A and B). Further, at this time, because displacement of the second axial portion 94 in the axial direction (the direction of arrows A and B) is regulated by the stopper 100, the second axial portion 94 is not displaced in the axial direction together with the piston 48. Further, since rotational displacement of the piston 48 with respect to the first housing 18 is regulated by the guide members 64, the piston 48 is not rotated together with the first axial portion 92.

The indicator element 28 includes a first indicator 118, which is screw-engaged with the screw hole 106 of the handle 72 and which is displaceable along the axial direction, and a second indicator 120 connected to the first indicator 118, which is accommodated in the accommodating hole 108.

The first indicator 118 has a cylindrical shape and is equipped with a first small diameter portion (threaded portion) 122 formed on a side of the valve body 16 and screw-engaged with the screw hole 106, and a first large diameter portion (visual confirming member) 124 formed on a side of the gripping member 98 of the handle 72 and accommodated within the accommodating hole 108. In addition, a shaft hole 126 is formed along the axial direction in central portions of the first small diameter portion 122 and the first large diameter portion 124. The shaft hole 126 is formed with a rectangular shape in cross section, corresponding to the cross sectional shape of the shaft 68, such that the shaft 68 abuts against the inner wall surfaces thereof upon insertion of the shaft 68.

More specifically, because the first indicator 118 is not displaced relatively in the direction of rotation with respect to the shaft 68 that is inserted through the shaft hole 126, displacement thereof in the direction of rotation is regulated through the piston 48, the rotational displacement of which also is regulated.

A second threaded portion 127, having threads engraved along the outer circumferential surface thereof, is formed on the first small diameter portion 122. The second threaded portion 127 is screw-engaged with respect to the screw hole 106 of the third axial portion 96, which constitutes part of the handle 72. More specifically, by rotation of the handle 72, the first indicator 118, which is screw-engaged with the third axial portion 96, is displaced in the axial direction inside of the accommodating hole 108. Stated otherwise, the rotational displacement of the handle 72 is converted to linear displacement of the indicator element 28, through the screw hole 106 having the second female threads 104 therein and the second threaded portion 127.

Further, the screw pitch P2 of the second threaded portion 127 and the second female threads 104 is set to be larger than the screw pitch P1 of the first threaded portion 74 of the first axial portion 92 on the handle 72 and the first female threads 70 of the piston 48, with which the first threaded portion 74 is screw-engaged (P2>P1). For example, the screw pitch P2 is set roughly 10 to 20 times greater than the screw pitch P1.

A fitting hole 128 that opens upwardly and communicates with the shaft hole 126 is formed in the first large diameter portion 124. A part of the second indicator 120 is inserted and fitted into the fitting hole 128. As a result, the second indicator 120 is connected to an upper part of the first indicator 118.

Further, plural circumferential grooves (scale markings) 130a are formed along the circumferential direction on the outer peripheral surface of the first large diameter portion 124. The circumferential grooves 130a are formed substantially perpendicular to the axis of the first indicator 118, and are disposed as a plurality while being separated at equal intervals mutually from each other along the axial direction of the first indicator 118.

The second indicator 120 is formed in a bottomed tubular shape, and the second small diameter portion 132 thereof, which is formed in a cylindrical shape, is fitted into the fitting hole 128 of the first indicator 118. Together therewith, a second large diameter portion (visual confirming member) 134, which is expanded in diameter with respect to the second small diameter portion 132, is accommodated in the accommodating hole 108 of the gripping member 98. The second large diameter portion 134 is formed with substantially the same diameter as the first large diameter portion 124 of the first indicator 118, and the outer peripheral diameter thereof is formed to be substantially equivalent to the inner peripheral diameter of the accommodating hole 108. In addition, on the first and second indicators 118, 120 that make up the indicator element 28, the outer circumferential surfaces of the first and second large diameter portions 124, 134 form interconnected peripheral surfaces, along the axial direction of the first and second indicators 118, 120.

On the second small diameter portion 132, a spring 136 is interposed between an end of the second small diameter portion 132 and the end of the shaft 68, facing the shaft hole 126 of the handle 72. The spring 136 passes through the shaft hole 126, such that via the shaft 68, the elastic force of the spring 136 urges the piston 48 and the indicator element 28 including the second indicator 120 in directions to separate mutually away from each other (the directions of arrows A and B).

Similar to the first indicator 118, plural circumferential grooves (scale markings) 130b are formed substantially perpendicular to the axis of the second indicator 120 and extend along the circumferential direction on the outer peripheral surface of the second large diameter portion 134. The circumferential grooves 130b are disposed as a plurality, while being separated at equal intervals mutually from each other along the axial direction. Moreover, the circumferential grooves 130a formed on the first large diameter portion 124, and the circumferential grooves 130b formed on the second large diameter portion 134, are mutually separated by substantially equal intervals along the axial direction.

Further, plural display elements 116 are disposed in an outer circumferential region on an end surface of the second large diameter portion 134, on a side thereof the gripping member 98. The display elements 116 are arranged to be separated mutually at equal intervals from each other, and are made up of numbers arranged in order from 1 to 8, for example (see FIG. 4). Additionally, when the gripping member 98 of the handle 72 is rotated, the pointer 114 of the gripping member 98 points to and indicates the display elements 116 of the second indicator 120, whereby the rotated amount of the gripping member 98 can be reliably confirmed.

Moreover, the number of the display elements 116 disposed on the second indicator 120 is not limited to the number described above. The number thereof is not particularly limited, insofar as the display elements 116 are each disposed at equal intervals along the circumferential direction.

Figure 5:
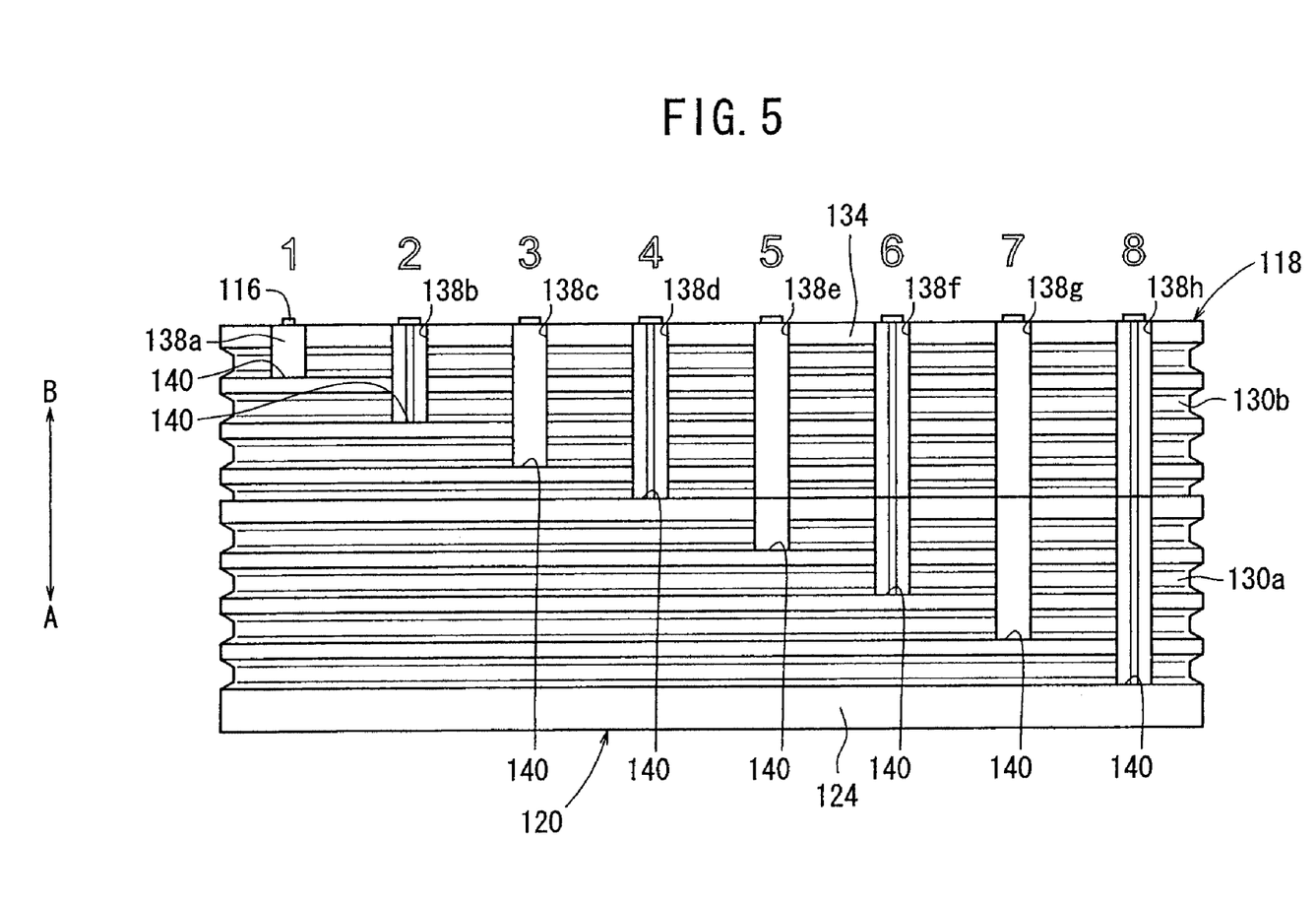
FIG. 5 is a schematic view in which outer circumferential surfaces of first and second indicators constituting the indicator element are shown in a planar form.
Figure 6:
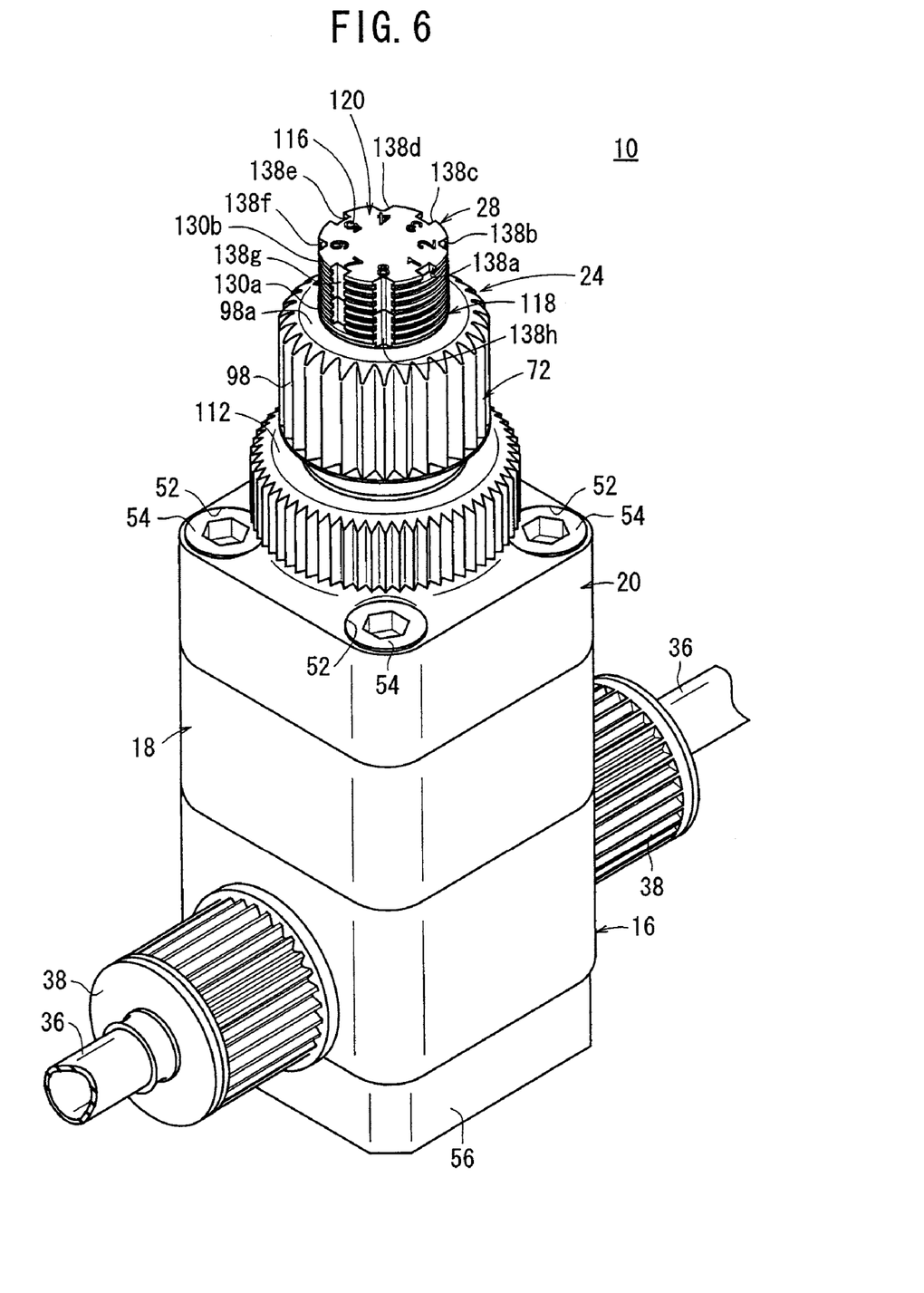
FIG. 6. is an exterior perspective view showing a valve open state in which the indicator element is displaced upwardly on the flow amount adjusting valve of FIG. 1.

Furthermore, as shown in FIGS. 5 and 6, on the outer circumferential surfaces of the first and second large diameter portions 124, 134, first through eighth indicating grooves 138a to 138h are formed respectively at positions corresponding to the plural display elements 116. The first through eighth indicating grooves 138a to 138h are recessed a predetermined depth into the outer circumferential surfaces of the first and second large diameter portions 124, 134, and are formed substantially parallel to the axis of the first and second indicators 118, 120. In addition, the first through eighth indicating grooves 138a to 138h extend a predetermined length from the end surface of the second large diameter portion 134, crossing over the circumferential grooves 130a, 130b.

Further, the first through eighth indicating grooves 138a to 138h are set with lengths that differ respectively from each other. For example, the first indicating groove 138a, corresponding to the number "1" of the display elements 116, extends from the end surface of the second indicator 120 until passing over the first of the circumferential grooves 130b that lies closest to the end surface, whereas the second indicating groove 138b, corresponding to the number "2" of the display elements 116, extends from the end surface until passing over the second of the circumferential grooves 130b.

More specifically, the lengths of the first to eighth indicating grooves 138a to 138h extend from the end surface while cutting across a number of circumferential grooves 130a, 130b that corresponds to the number of the display element 116 disposed on the end surface of the second large diameter portion 134, in directions separating away from the end surface.

The flow amount adjusting valve 10 according to the embodiment of the present invention is basically constructed as described above. Next, operations and effects thereof shall be explained.

In FIGS. 1 and 2, a valve-closed state is shown, in which the valve plug 26 is displaced toward the side of the valve seat 42 (in the direction of the arrow A) and is seated on the valve seat 42, and communication between the first port 12 and the second port 14 is interrupted. Tubes 36 are connected beforehand respectively to the first and second ports 12, 14 through the connecting caps 38. Further, the first and second indicators 118, 120 making up the indicator element 28 are accommodated in the accommodating hole 108 of the handle 72, such that the end of the second indicator 120 forms a substantially flat surface together with the end surface 98a of the gripping member 98, and the pointer 114 points toward and indicates the number "1" of the display elements 116.

While in the valve-closed state, an operator (not shown) grips the gripping member 98 of the handle 72, and by turning the handle 72 in a predetermined direction, the handle 72 is rotatably displaced while being retained in the second hole 46 of the second housing 20. As a result, the piston 48, which is screw-engaged with the first axial portion 92 of the handle 72, is displaced in a direction (the direction of the arrow B) to separate from the valve seat 42, and by displacement of the valve plug 26 together with the piston 48, the seat surface 84 of the valve plug 26 separates away from the valve seat 42. In this case, because the guide members 64, which engage in the guide grooves 50 of the first housing 18, regulate rotational displacement of the piston 48, the piston 48 is displaced only along the axial direction of the first housing 18.

As a result, the pressure fluid supplied from the first port 12 flows through the communication passages 40a, 40b and flows steadily to the second port 14, passing through the gap formed between the valve seat 42 and the tapered surface 86 of the valve member 78 that makes up the valve plug 26.

Further, together with displacement of the valve plug 26 upon rotation of the handle 72, the first indicator 118, which is screw-engaged in the screw hole 106 of the handle 72, is displaced in a direction separating away from the piston 48 (in the direction of the arrow B). In addition, the first large diameter portion 124 of the first indicator 118 and the second indicator 120 are displaced in unison upwardly along the accommodating hole 108. Specifically, the end of the second indicator 120 gradually projects upwardly on the handle 72 (in the direction of the arrow B) with respect to the end surface 98a of the gripping member 98.

At this time, the first indicator 118 is displaced only in the axial direction, since the shaft 68, which is inserted through the shaft hole 126, regulates relative displacement of the first indicator 118 in the direction of rotation with respect to the piston 48.

In this case, upon rotation of the handle 72, while the piston 48 and the indicator element 28 are displaced together in a direction (the direction of the arrow B) to separate away from the valve seat 42, the screw pitch P2 of the screw hole 106 in the handle 72, and of the second threaded portion 127 of the first small diameter portion 122, which is screw-engaged with the screw hole 106, is set to be larger than the screw pitch P1 of the first threaded portion 74 of the first axial portion 92, and of the first female threads 70 of the piston 48, with which the first axial portion 92 is screw-engaged (P2>P1). Owing thereto, the displacement amount C2 of the indicator element 28 including the first indicator 118, which occurs along with rotation of the handle 72, becomes greater than the displacement amount C1 of the piston 48 and the valve plug 26 (C1<C2).

As a result, compared with displacement of the valve plug 26 constituting the valve mechanism 22, the indicator element 28 can be displaced by a large amount with respect to the handle 72, whereby displacement of the valve plug 26 can be reliably and suitably confirmed through the indicator element 28, from the exterior of the flow amount adjusting valve 10.

Stated otherwise, even when the displacement amount of the valve plug 26 is small, because the indicator element 28 can be displaced to a large degree with respect to the handle 72, opening/closing operations of the valve plug 26 can be reliably and easily confirmed from the exterior.

Further, when the indicator element 28 projects with respect to the gripping member 98 that makes up the handle 72, the amount at which the indicator element 28 projects can be confirmed by the plural circumferential grooves 130a, 130b, which are formed along the outer circumferential surface of the first and second indicators 118, 120.

Figure 7:
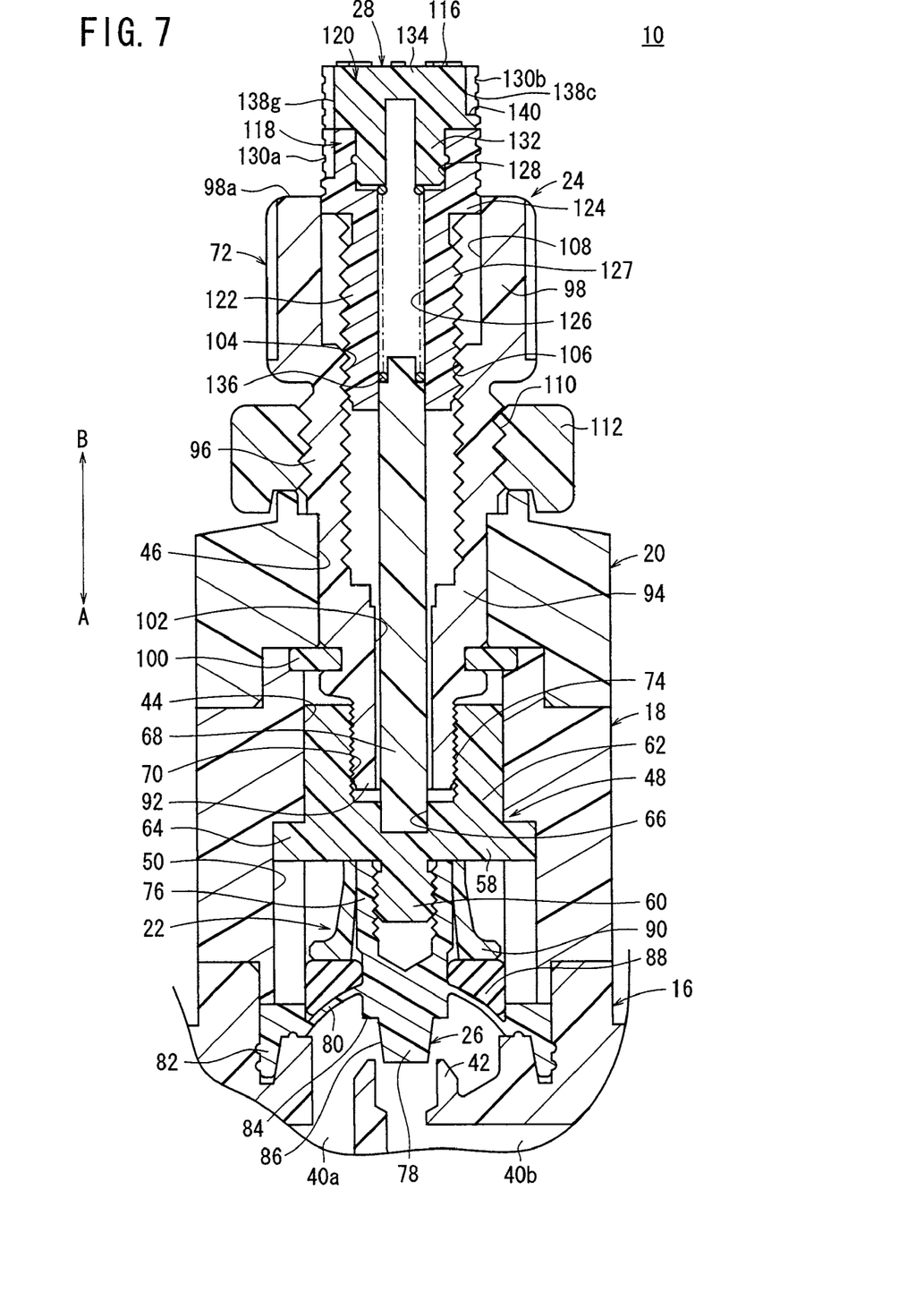
FIG. 7 is a vertical cross sectional view of the flow amount adjusting valve shown in FIG. 6.
Figure 8:
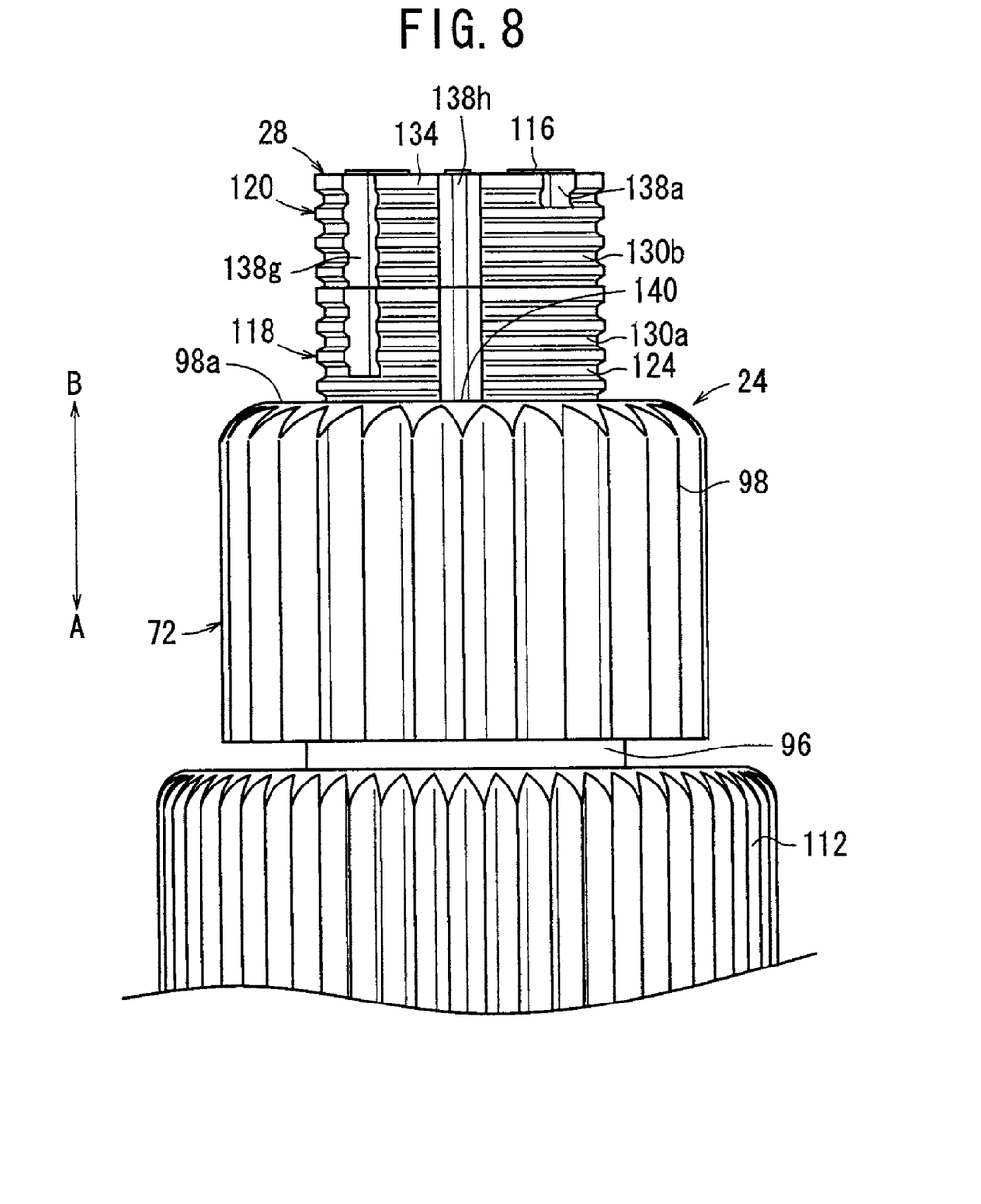
FIG. 8 is an enlarged side surface view showing the vicinity of the operating element and the indicator element in FIG. 6.

In greater detail, because the circumferential grooves 130a, 130b are separated from each other and arranged at equal intervals along the axial direction of the first and second indicators 118, 120, as shown in FIGS. 7 and 8, when an operator looks at the handle 72 and the indicator element 28 from the side, the number of circumferential grooves 130a, 130b that are exposed outside of the end surface 98a of the gripping member 98 can be confirmed, thereby enabling the projected amount to be confirmed.

In other words, the amount of projection of the indicator element 28 becomes large as the number of circumferential grooves 130a, 130b exposed outside of the handle 72 grows larger, and thus it can be appreciated that the degree of opening of the valve plug 26 also is large.

In addition, by rotating the handle 72 further in the same direction, the piston 48 is displaced (in the direction of the arrow B) so as to separate even more from the valve seat 42, whereupon by displacement of the valve plug 26 together with the piston 48, the valve plug 26 separates even more with respect to the valve seat 42, so that the flow amount of the pressure fluid that flows between the valve member 78 and the valve seat 42 increases. Further, in a similar manner, the first indicator 118 also is displaced in a direction to separate away from the piston 48, and projects outwardly further with respect to the end surface 98a of the gripping member 98. In this case as well, the amount at which the indicator element 28 projects can be confirmed from the number of outwardly exposed circumferential grooves 130a, 130b.

Furthermore, the number of rotations of the handle 72, which is rotated by the operator, can be confirmed by the first through eighth indicating grooves 138a to 138h disposed on the outer circumferential surface of the indicator element 28.

For example, in the event that the handle 72 is rotated one time about its axis, the bottom portion 140 of the first indicating groove 138a, corresponding to the number "1" of the display elements 116 on the indicator element 28, matches in position with the end surface 98a of the gripping member 98. Owing thereto, the number of rotations of the handle 72 can be confirmed, thus confirming that the handle 72 has been rotated by one rotation only from the valve-closed state (see FIG. 1) in which the valve plug 26 is seated on the valve seat 42 and the indicator element 28 is accommodated completely inside of the accommodating hole 108.

More specifically, on the first through eighth indicating grooves 138a to 138h, the number of rotations of the handle 72 can be easily confirmed by confirming the first through eighth indicating grooves 138a to 138h, bottom portions 140 of which are brought into position with the end surface 98a of the gripping member 98, and by reading the indicator elements 116 that correspond with the first through eighth indicating grooves 138a to 138h.

As a result, the amount of opening/closing of the valve plug 26 can be reliably and easily confirmed based on the number of rotations of the handle 72, thus enabling the flow amount of the pressure fluid to be highly accurately adjusted under a displacement action of the valve plug 26.

Furthermore, as shown in FIG. 4, by observing the flow amount adjusting valve 10 from above, and confirming the display element 116 of the second indicator 120 that is pointed to by the pointer 114 disposed on the gripping member 98, the angle of rotation per each one rotation of the handle 72 can be confirmed. For example, in the event that the handle 72 is rotated from a state in which the number "1" of the display elements 116 is indicated by the pointer 114, and the handle 72 is rotated until the pointer 114 points to the number "3" of the display elements 116, the angle of rotation of the handle 72 becomes 90°, whereby it is confirmed that the valve plug 26 has been displaced by a displacement amount along the axial direction, for the case in which the handle 72 is rotated roughly an additional 90°.

More specifically, with the indicator element 28, the number of rotations of the handle 72 is confirmed by the first through eighth indicating grooves 138a to 138h, and moreover, by reading the display element 116 pointed to by the pointer 114, the angle of rotation of the handle 72 can be confirmed. Accordingly, the opening/closing amount of the valve plug 26 can be highly reliably confirmed based on the number of rotations as well as the angle of rotation of the handle 72.

In addition, as shown in FIG. 7, when the handle 72 is rotated even further, and at a point in time when the bottom portion 140 of the eighth indicating groove 138h on the indicator element 28 matches in position with the end surface 98a of the gripping member 98, a fully valve-open state is realized, in which the piston 48 is displaced maximally upward and the valve plug 26 is separated maximally from the valve seat 42.

Moreover, when the valve plug 26 has been separated from the valve seat 42 and the pressure fluid flows at a predetermined desired flow amount, the lock nut 112 is rotated and caused to abut against the end of the second housing 20, such that further rotational displacement of the handle 72 is regulated. Owing thereto, displacement of the valve plug 26 in the axial direction is regulated, and the flow amount of the pressure fluid is maintained substantially constant.

Next, an explanation shall be made concerning a state in which the valve plug 26 is displaced from the aforementioned valve-open state toward the valve seat 42 (in the direction of the arrow A), while the flow amount of the pressure fluid is constricted (see FIG. 2).

First, as a result of the operator gripping the gripping member 98 of the handle 72 and rotating the gripping member 98 in an opposite direction at a given rotational force, the handle 72 is rotatably displaced in a state in which the handle 72 is retained in the second hole 46 of the second housing 20, and the piston 48, which is screw-engaged with the first axial portion 92, is displaced toward the side of the valve seat 42 (in the direction of the arrow A). Accordingly, the valve plug 26 is displaced toward the valve seat 42, whereupon the gap between the tapered surface 86 of the valve member 78 and the valve seat 42 is made smaller. Owing thereto, the flow amount of the pressure fluid that flows through the communication passages 40a, 40b is constricted.

Further, the first indicator 118, which is screw-engaged with the screw hole 106 of the handle 72, is displaced toward the piston 48 (in the direction of the arrow A), whereupon the first large diameter portion 124 of the first indicator 118 and the second indicator 120 are displaced downwardly into the accommodating hole 108. Specifically, the first and second indicators 118, 120 are accommodated gradually within the accommodating hole 108 of the gripping member 98, and the amount at which the first and second indicators 118, 120 project with respect to the end surface 98a of the gripping member 98 becomes smaller.

In this case as well, upon rotation of the handle 72, while the piston 48 and the indicator element 28 are displaced together toward the valve seat 42 (in the direction of the arrow A), the displacement amount C2 of the indicator element 28 including the first indicator 118 becomes greater than the displacement amount C1 of the piston 48 and the valve plug 26 (C1<C2). Owing thereto, the indicator element 28 is displaced so as to be rapidly accommodated inside the accommodating hole 108, with respect to the displacement of the valve plug 26.

Further, the projecting amount of the indicator element 28 can be confirmed by the plural circumferential grooves 130a, 130b that are formed on the indicator element 28, and based thereon, the displacement amount of the valve plug 26 as it is displaced toward the valve seat 42 can also be confirmed.

In addition, by further rotating the handle 72, the piston 48 and the valve plug 26 are displaced more closely toward the side of the valve seat 42 (in the direction of the arrow A), and when the seat surface 84 of the valve plug 26 is seated with respect to the valve seat 42, the state of communication of the communication passages 40a, 40b is interrupted, and flow of the pressure fluid from the first port 12 to the second port 14 is halted. More specifically, the indicator element 28 is accommodated completely within the accommodating hole 108 of the handle 72, and the valve-closed state (OFF state), in which the end of the second indicator 120 and the end surface 98a of the gripping member 98 form substantially the same flat surface, is comprehended from the exterior (see FIGS. 1 and 2).

In the above manner, in the present embodiment, a valve plug 26, which is seated on a valve seat 42 of a valve body 16, a piston 48 connected to the valve plug 26 and which is displaceable along the axial direction, and a handle 72, which is retained rotatably with respect to the first and second housings 18, 20 and is capable of adjusting an amount of opening/closure of the valve plug 26 through the piston 48, are provided. In addition, the piston 48 is screw-engaged with a first axial portion 92 of the handle 72, and the valve plug 26 is displaced in the axial direction via the piston 48 by rotating the handle 72. Together therewith, an indicator element 28 is accommodated inside the handle 72, wherein by threaded engagement of a first indicator 118 thereof with respect to the handle 72, the indicator element 28 is caused to be displaced in the axial direction under a rotating action of the handle 72. Further, the screw pitch P2 of the second threaded portion 127 of the first indicator 118, as well as the screw hole 106 with which the second threaded portion 127 is screw-engaged, is set larger than the screw pitch P1 of the first threaded portion 74 formed on the first axial portion 92, as well as the first female threads 70 of the piston 48 that are screw-engaged with the first threaded portion 74.

As a result, because the displacement amount of the indicator element 28 can be made large with respect to the displacement amount of the valve plug 26, the opening/closing amount of the valve plug 26 can be reliably and easily confirmed by the indicator element 28. Along therewith, the flow amount of the pressure fluid is capable of being adjusted with high accuracy.

Further, displacement of the valve plug 26 can be confirmed reliably by means of a simple structure, in which the indicator element 28 is accommodated inside the handle 72, the first indicator 118 of the indicator element 28 is screw-engaged with the handle 72, and the indicator element 28 is displaced along the axial direction, and made to project outward, simply by rotating the handle 72. Also, the flow amount adjusting valve 10 including the indicator element 28 can be manufactured at a low cost.

The flow amount adjusting valve according to the present invention is not limited to the above-described embodiment, and various other structures may be adopted as a matter of course, without deviating from the essential features and gist of the present invention.

What is claimed is:

1. A flow amount adjusting valve comprising:
   a body having a passage therein through which a pressure fluid flows;
   a valve plug displaceably disposed inside of said body and which is seatable on a valve seat formed in said body;
   an indicator element, which is displaced along an axial direction based on a displacement operation of said valve plug, thereby enabling an opening/closing amount of said valve plug to be confirmed visually from the exterior;
   an operating element having a first screw-engaged portion with which said valve plug is screw-engaged, and a second screw-engaged portion with which said indicator element is screw-engaged, said operating element, to which a predetermined rotational force is applied, being rotatably supported on said body; and
   a visual confirming member, which is exposed outside of said operating element when displaced with respect to said operating element,
   wherein said valve plug and said indicator element are displaced respectively along the axial direction by rotation of said operating element, and a screw pitch of said second screw-engaged portion is set to be larger than a screw pitch of said first screw-engaged portion, and
   wherein said indicator element includes a plurality of display elements disposed on a upper surface of said visual confirming member, which are made up of numbers corresponding to the number of rotations of said operating element, and a pointer for indicating one of said display elements, said display elements being separated by equal intervals and arranged along a circumferential direction of said visual confirming member.

2. The flow amount adjusting valve according to claim 1, wherein said indicator element comprises a threaded portion arranged at the interior of said operating element and screw-engaged with said second screw-engaged portion, wherein scale markings are disposed respectively on said visual confirming member for enabling a number of rotations of said operating element to be confirmed.

3. The flow amount adjusting valve according to claim 2, wherein said visual confirming member is accommodated inside said operating element at a valve closure time when said valve plug is seated on said valve seat, and said visual confirming member is exposed outside of said operating element at a valve-open time when said valve plug is separated from said valve seat.

4. The flow amount adjusting valve according to claim 3, wherein said scale markings extend along a circumferential direction on an outer circumferential surface of said visual confirming member, and are formed by a plurality of grooves, which are separated by equal intervals along the axial direction of said indicator element.

5. The flow amount adjusting valve according to claim 4, wherein said visual confirming member is displaced along the axial direction and projects a predetermined height outwardly with respect to an upper surface of said indicator element in a valve-open state in which said valve plug is separated from said valve seat, and the number of rotations of said operating element is capable of confirmation based on a projected height of said visual confirming member.

6. The flow amount adjusting valve according to claim 3, wherein said body further comprises a locking mechanism, which regulates rotational displacement of said operating element with respect to said body.

7. The flow amount adjusting valve according to claim 1, wherein a plurality of indicating grooves, which extend along the axial direction from an upper surface of said visual confirming member at positions corresponding to said display elements, are disposed on an outer circumferential surface of said visual confirming member.

8. The flow amount adjusting valve according to claim 7, wherein lengths of said indicating grooves are set to differ corresponding to a display of said display elements, and the number of rotations of said operating element can be visually confirmed from said indicating grooves, bottoms of which are matched in position with respect to an end surface of a gripping member that constitutes said operating element.

9. The flow amount adjusting valve according to claim 1, wherein a screw pitch of said second screw-engaged portion is set to be approximately 10 to 20 times the screw pitch of said first screw-engaged portion.

* * * * *